Aug. 9, 1938.  N. I. PERRY  2,125,952
COMBINED FOOT BRAKE AND ACCELERATOR
Filed Aug. 12, 1936  3 Sheets-Sheet 1
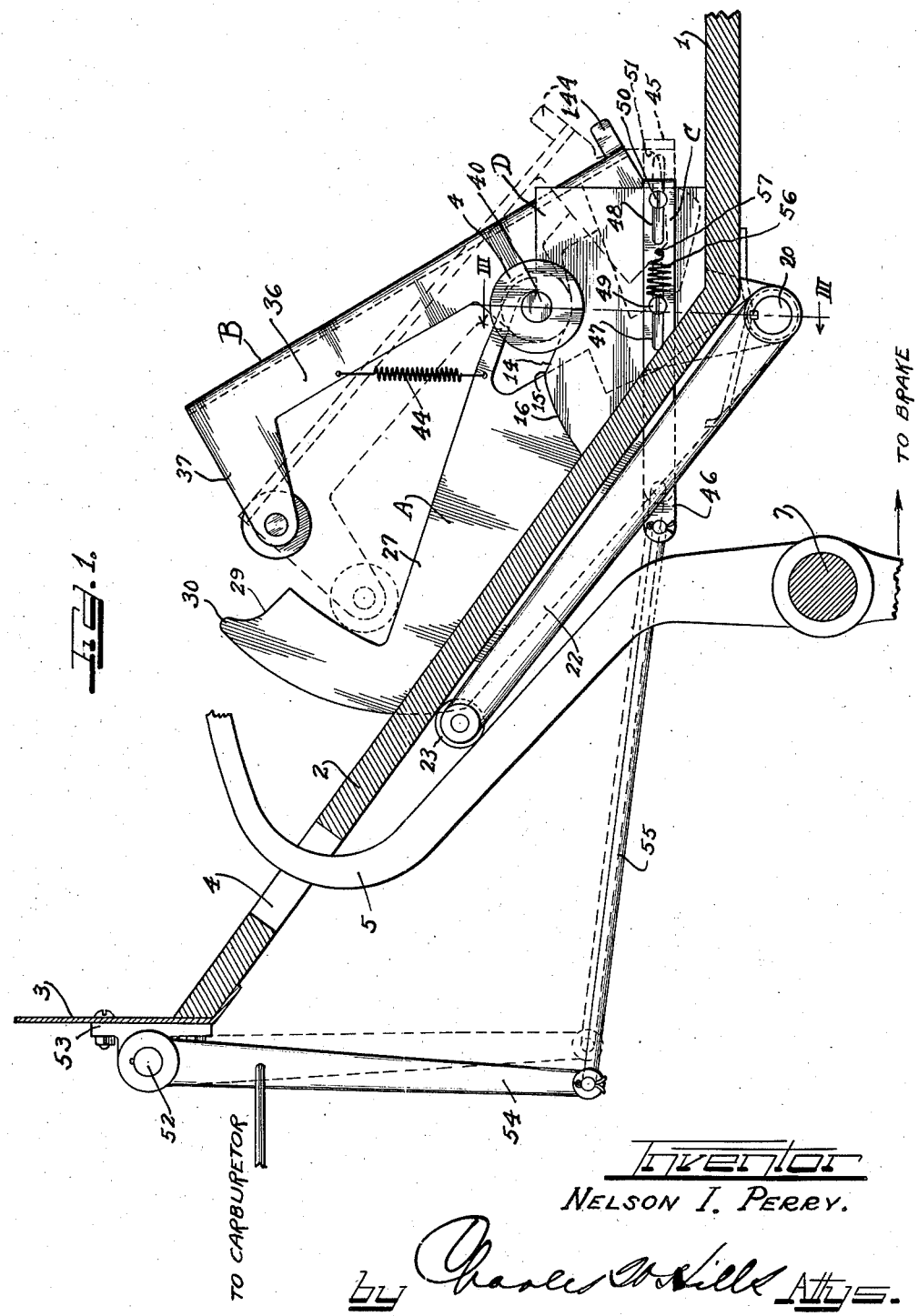
Inventor
NELSON I. PERRY.
by Charles W. Wills Attys.

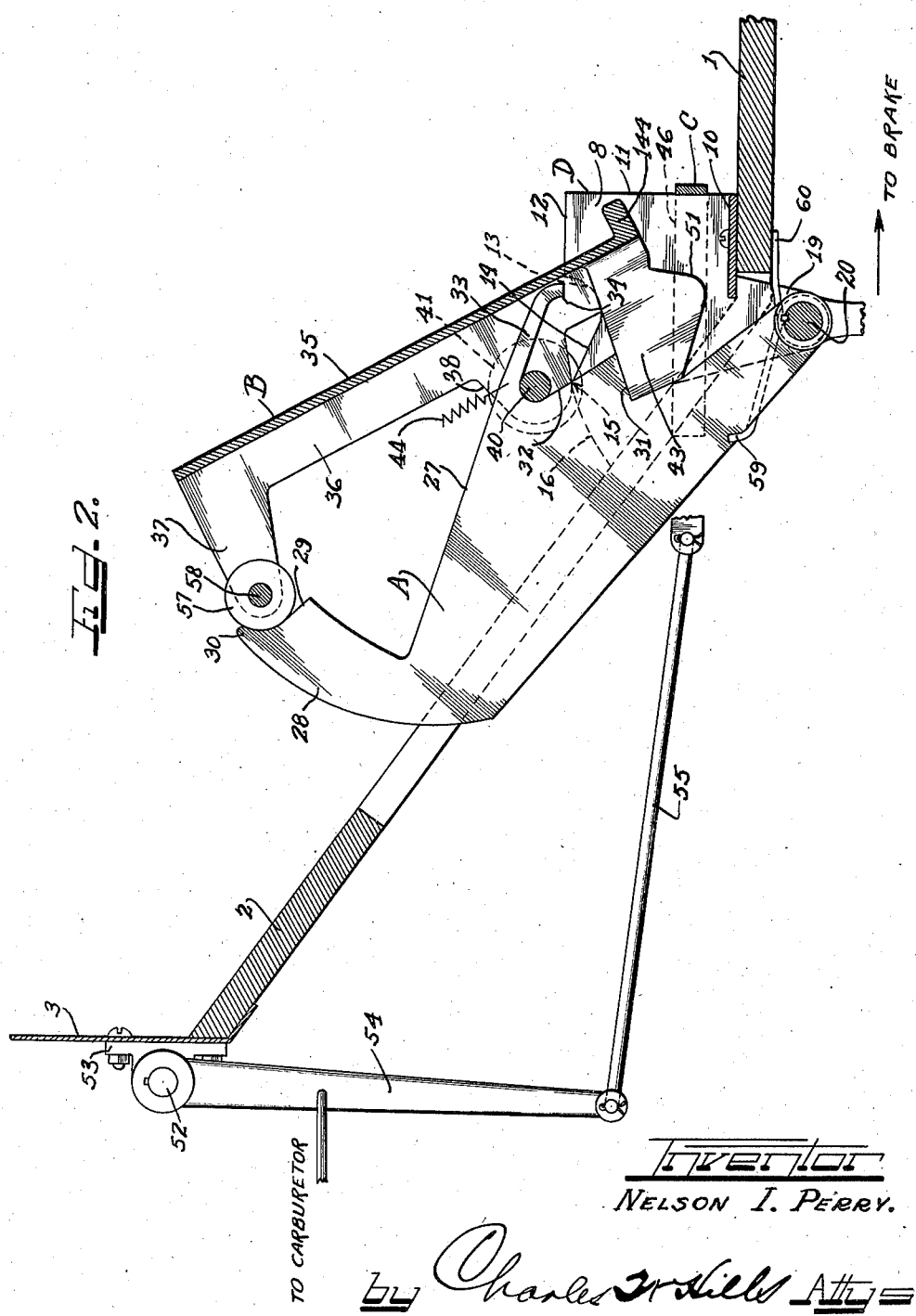

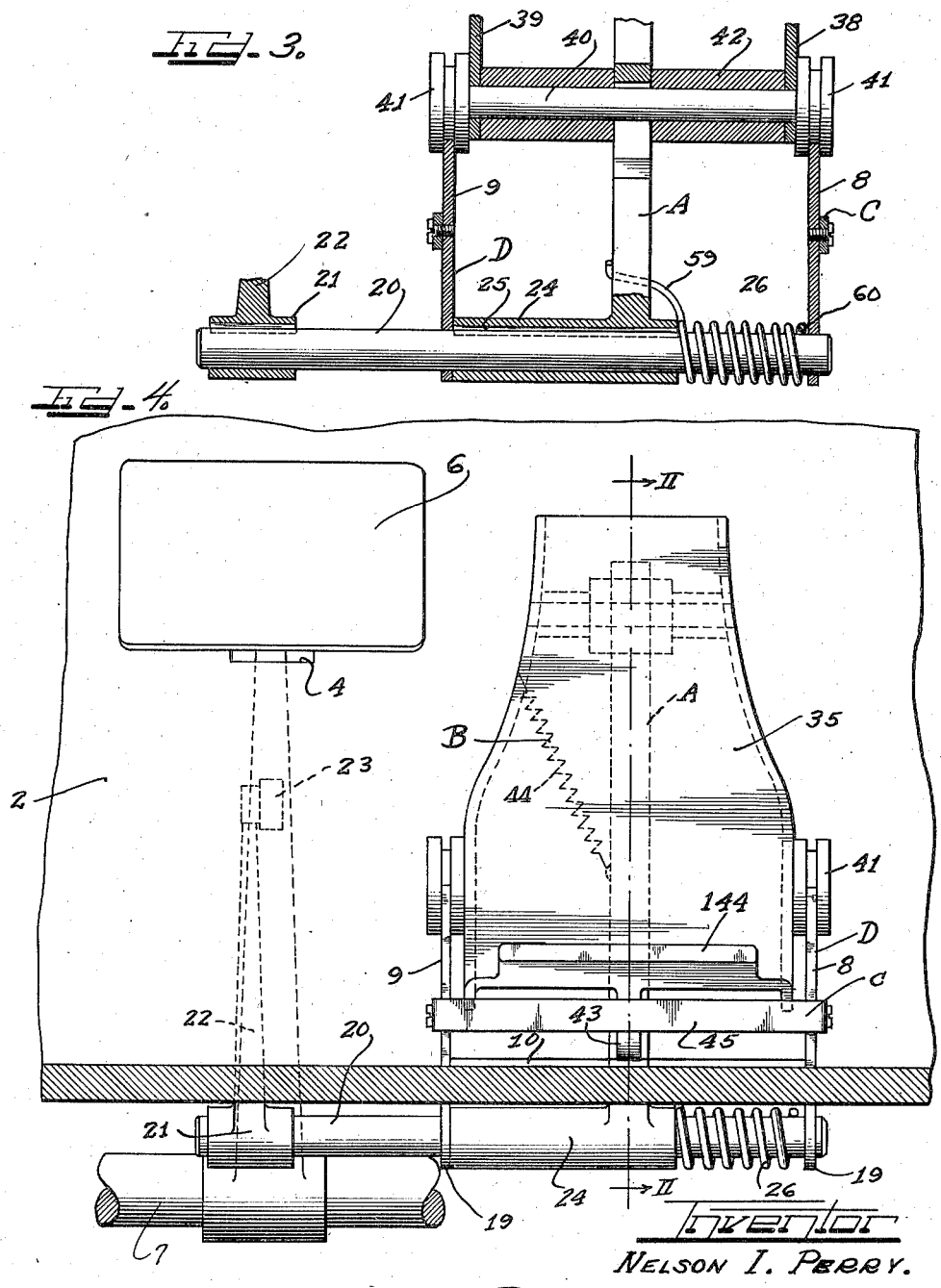

Patented Aug. 9, 1938

2,125,952

UNITED STATES PATENT OFFICE 2,125,952

COMBINED FOOT BRAKE AND ACCELERATOR

Nelson I. Perry, Chicago, Ill.

Application August 12, 1936, Serial No. 95,539

14 Claims. (Cl. 192—3)

The present invention relates to combined foot brake and accelerator for motor vehicles.

The present invention is to provide a combined brake and accelerator control, for automotive vehicles, wherein the engine throttle and brake may be selectively operated by a single foot pedal.

Another object of the invention is to provide, in a combined brake and throttle control, a single pedal which is mounted for movement on a fixed track whereby it may be used alternately or selectively to operate either the engine speed control mechanism or the brakes of the vehicle, by foot pressure applied to the pedal.

A further object of the present invention is to provide a combined accelerator and brake control structure, embodied in relatively movable members, wherein a foot pedal is utilized for both accelerator control and brake operation by foot pressure applied to the pedal, and which pedal is shiftable on its mounting with respect to the brake operating member, and the parts are so arranged that when shifted to desired position it is prevented from accidental displacement from such position.

A still further object of the present invention is to provide, in a structure of the class described, a shiftable pedal which is supported by rollers engaging tracks along which the pedal may be moved, and on which the pedal may be rocked or rotated in any position to which it is moved.

A still further object of the present invention is to provide a structure of the class described which may be utilized in addition to the usual brake pedal provided on an automotive vehicle, for actuating such pedal to apply the vehicle brakes.

The above, other and further objects of the present invention will be apparent from the following description and accompanying drawings.

The accompanying drawings illustrate an embodiment of the present invention, and the views thereof are as follows:

Figure 1 is a fragmental vertical sectional view through a portion of the floor boards of an automotive vehicle, showing in elevation the combined brake and accelerator control mechanism of the present invention, with the movable parts shown in full lines in their normal, or retracted position, as arranged for actuation of the accelerator control mechanism, and in dotted lines at the extent of their movement for maximum acceleration.

Figure 2 is a view similar to Figure 1, taken substantially in the plane indicated by line II—II of Figure 4, and showing a relative arrangement of the parts when the pedal is in position for actuating the brake means, and further showing the relationship of the relatively movable parts to prevent dislodgement of the pedal during its operation to apply the brakes.

Figure 3 is a fragmental sectional view taken substantially on the plane indicated by line III—III of Figure 1; and Figure 4 is a front elevational view partly in section of the control device of the present invention arranged with the pedal in brake actuating position and showing it as alongside the usual brake pedal of a vehicle.

The drawings will now be described.

The usual horizontal portion 1 of a floor board is fragmentarily shown, and adjacent it is the inclined floor section 2 which at its upper end is connected to the usual dash 3. The inclined portion 2 of the floor is provided with an elongated opening 4 through which the arm 5 of a foot brake may pass so that the pedal 6 thereon is readily available for use by the driver of the vehicle. The lower end of the arm is secured to a brake actuating shaft 7, of usual construction.

The combined brake and throttle actuating structure of the present invention includes two relatively movable members, A and B, A being the member for actuating the brakes, and B the pedal for actuating the member A to apply the brakes, and also for operating the throttle or accelerator mechanism of the vehicle.

The structure of the present invention is made as a unitary one, to be bodily applied to any automotive vehicle.

A stationary frame or trackway D, which is U-shaped in end elevation, includes two side portions 8 and 9 with a bottom 10, adapted to be secured to the horizontal floor 1 by any suitable fastening means, so as to rigidly support the structure on the floor in operative position.

The upper edges of the sides 8 and 9 provide tracks of irregular contour extending from the vertical edges 11 of said sides in a forward direction with, successively, a horizontal portion 12 and a recessed curved portion 13, forming a dwell for rollers to be later described. Forwardly of the dwell, the tracks are upwardly and forwardly inclined as at 14, reaching a high point as at 15, from which point the extreme forward edges of the pates are curved downwardly, as at 16, to the inclined portion 2 of the floor.

Lugs 19 depend from said side plates 8 and 9 and are apertured to carry an auxiliary shaft 20. One end of said shaft 20 extends through the lug 19 on the side plate 9 and carries a hub 21, keyed thereto, from which extends a lever 22 having an offset roller 23 at its outer end to bear against a portion of the arm 5 of the regular brake pedal structure.

Between the lugs 19, on the auxiliary shaft 20, is an elongated hub 24 which is suitably secured to said shaft, as by means of a key 25, and which is an integral part of the member A. Interposed between the lug 19 of the side plate 8 and the adjacent end of the hub 24 is a spring 26 whose function is to maintain the member A and pedal B in operative association. Said spring 26 has one extended end 59 hooked under the member A and the other end 60 pressed against the underside of the floor board 1.

Referring to Figure 2 it will be observed that the member A has a forwardly and upwardly inclined lower edge and a forwardly convergent top edge 27, from the forward end of which extends an upstanding leg 28. Said leg 28 is provided with a downwardly and rearwardly curved end 29, having a forward projection 30 serving as a stop.

Above its connection to the auxiliary shaft 20 the member A is fashioned with two substantially V-shaped notches 31 and 32, with the notch 32 above the notch 31. A portion of the notch 32 is defined by an overhanging rearwardly extending arm 33, constituting an integral part of the member A and terminating in a downturned end 34 which serves as a stop.

The member A oscillates with the auxiliary shaft 20, under conditions to be hereinafter described, to thereby move the lever 22 against the foot brake pedal to actuate the vehicle brakes.

The pedal B is formed from a flat piece of metal, bent into substantially channel form to provide an elongated foot rest surface 35, downturned sides 36 and at the upper or outer end, downwardly extending legs 37.

Adjacent the rear end of the member B are formed lugs 38 and 39 which are apertured to support a shaft 40. On the ends of the shaft 40, outwardly of the lugs 38 and 39, are grooved rollers 41 which travel on the tracks of the side plates 8 and 9. Spacing sleeves 42 on the shaft 40 between the lugs 38 and 39 maintain the rollers in register with the tracks.

Attached to the rear or inner end of the member B, is a downwardly extending lug 43, shaped to conform to the V-shaped notch 31 in the member A. At the lower extremity of the foot engaging surface 35 of the member B, is a heel rest 144 against which the heel of the vehicle operator rests when his foot is on the pedal B.

A tension spring 44 connecting said members A and B functions to maintain the rollers 41 normally within the dwells 13 of the trackways, that is with the pedal B in its retracted or normal position, as illustrated in Figure 1 in full lines.

Surrounding the frame is a U-shaped strap C having a back portion 45 (Figure 4) and two side portions 46 extending along the outer surfaces of the side walls 8 and 9 of the frame. The side members 46 are each provided with slots 47 and 48 through which pass screws 49 and 50 respectively. The provision of the slots and screws limits the movement of the strap C to the right as viewed in Figure 1, and thus limits the downward movement of the pedal B when it is depressed by toe pressure for actuating the throttle mechanism of the vehicle. When the pedal B is in normal or retracted position the nose 43 engages the rear portion 45 of the strap C by contact therewith of its edge 51, as the pedal B is rocked.

In the accompanying drawings the throttle or accelerating mechanism is somewhat schematically shown, and includes a rock shaft 52 (Fig. 1) supported by means of a bracket 53 fastened to the dashboard 3. A rocker arm 54 is keyed to the shaft 52 and is connected by a link 55 to the adjacent ends of the sides 46 of the strap C, so that whenever the strap is moved by means of the pedal B the shaft 52 will be rocked accordingly. It is thought unnecessary to show the connections between the shaft 52 and the throttle control of the vehicle, as these constructions are well understood in the art.

The means for returning the strap C to its normal position comprise springs 56 connected at one end to the screws 49 and at the opposite ends to pins 57 on the sides 46 of the strap C. The action of the springs 56, when pressure is relieved from the pedal B, is to hold the strap C against the edge 51 of the lug 43 on the pedal B as the pedal moves to its more upright position (as shown in full lines, Fig. 1), and to cause the throttle to close.

Referring to Figure 1 of the drawings, with the parts arranged for actuation of the throttle control or accelerator mechanism, the vehicle operator places his foot on the pedal B and with toe pressure depresses the upper end of the pedal to open the throttle a sufficient amount to secure the desired speed of the vehicle. During the operation of the vehicle the operator's foot remains on the pedal B.

If occasion should arise making it necessary to apply the brake, then the operator asserts foot pressure more particularly against the lower or inner end of the pedal B to move it bodily along the tracks with the rollers 41 moving upwardly over the inclined portions 14 of the track, thereby moving the roller 57 which is supported on a shaft 58 connecting the ends of the arm 37 of the pedal B, into alignment with the leg 28 of the member A. Such movement of the pedal B is effected against the tension of the spring 44.

The distance between the stop 30 of the leg 28 of the member A and the trough of the notch 32 of the member A is such as to maintain the roller 57 against the stop 30 and the shaft 40 in the trough of the V-shaped notch, thereby preventing movement of the pedal B in a direction to overrun the leg 28 of the member A. In addition, the engagement of the nose 43 with its notch 31 limits movement of the pedal B upwardly of its length. Thus the pedal B is automatically and firmly locked against displacement when moved by foot pressure into position for operating the member A to actuate the brakes.

With the pedal B in the position of Figure 2, foot pressure applied to the pedal will then move the free end of the member A downwardly to thereby cause the arm 22 to actuate the brake pedal 5 to apply the brakes. The amount of braking action applied depends of course on the amount of pressure given to the pedal B by the operator's foot. As soon as pressure is relieved against the pedal B, the spring 26 becomes effective to move the member A to its normal position. The pedal B also returns to its normal or retracted position, with the rollers rolling down the inclines 14 into the dwells 13 where the rollers come to rest, and the parts then appear as in Figure 1. The arm 33, during this return of the pedal B to normal position, serves as a guide for the shaft 40 to prevent the heel of the pedal from raising and failing to move into cooperative relation with the strap C.

In order to afford a comfortable support for the foot of the operator, the face 35 of the pedal B is made broad, as may be observed in Figure 4, and the heel piece 144 is long, so that whatever the position of the operator's foot on the pedal B, the pedal may be readily shifted into brake actuating position.

The surfaces 16—16 of the tracks 8 and 9 are curved in an arc with the axis of the shaft 20 as a center. The shaft 20 is below and to the rear (right in Figures 1 and 2) of the high points 15 so that, during braking operation, as the pedal B actuates the member A and the rollers 41—41 pass down the curved track surfaces 16—16, arm 33 of the member A follows in back of the shaft 40 of the pedal B. The angle of the arm 33, in relation to the arc of the surfaces 16—16 prevents the pedal B from slipping back out of working contact with the member A, even if the operator's foot is removed from the pedal B, until the spring 26 returns the member A to normal position. Then the change in the angle between the arm 33 and the rearward sloping portions 14—14, permits the spring 44, aided by gravity, to return the pedal B on its rollers 41—41 down the slopes 14—14 until said rollers rest in the dwells 13—13.

Another purpose of the arm 33 is to hold the member A automatically locked in a position to be properly contacted by the pedal B for braking even should the spring 26 break, and also to prevent the pedal B from leaving its track should the spring 44 break.

In actual manufacture a very slight clearance is left between the arm 33 and the shaft 40, so there will be free movement of the pedal B along its track.

The placing of the roller 57 and the lug 43 at opposite ends of foot pedal B prevents any independent rocking of the pedal B during a braking operation, should the operator exert pressure with only the heel or only the toe, and causes the pedal and member A to rotate as a unit about the shaft 20.

It will be observed that the pedal B is actuated by foot pressure in one position on the stationary track support to operate the throttle mechanism of the vehicle and in another position on said track support to apply brake pressure. This is an advantage for the reason that motor vehicle operators become accustomed to applying toe pressure to the accelerator and thus it becomes second nature to apply such toe pressure to the pedal for brake application, when the pedal B is shifted into the position of Figure 2.

The tension of the springs 44 and 26, is such as to readily return the parts to normal position, as the foot pressure is released from the pedal B, and at the same time to prevent rattling of the parts. The tension of the spring 44 is not so great as to afford appreciable resistance to movement of the pedal B from its normal position with the rollers in the dwells 13 to its position for actuating the brake mechanism, as illustrated in Figure 2. The shift of the pedal B may be accomplished easily and readily by an operator familiar with its mode of operation.

One of the principal advantages of my device as applied to motor vehicles is that it saves the time and energy necessary to shift the foot back and forth from accelerator to brake pedal. This is particularly desirable in crowded city driving where frequent stops and starts are the rule.

It will be understood that the device can be used to control a braking system separate from the one actuated by the usual brake pedal. The device can also be used for other than automotive control where a selective dual control of two operations by one foot pedal is desired.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

I claim:

1. In a motor vehicle having brake and throttle controls, a stationary trackway having a dwell and a forwardly and upwardly inclined portion beyond said dwell, a foot pedal, rollers carried by said pedal for travel along said trackway to permit depression of the toe of said pedal at different positions of said rollers therealong, and means associated with said pedal operative when said rollers are in said dwell upon depression of the toe of said pedal to actuate said throttle control.

2. A combined foot brake and accelerator actuating mechanism adapted to be applied as a unit to an automotive vehicle, said unit including a track member adapted to be fixedly secured to the floor of the vehicle, a pedal supported on said frame and shiftable along the same in the direction of the length thereof, means operable by vertical rocking movement of said pedal under the influence of foot pressure for actuating a throttle mechanism of the vehicle when said pedal is in one position on said track member, and means operable by rocking movement of said pedal for actuating a brake mechanism of the vehicle when said pedal is in another position on said frame.

3. In a motor vehicle having brake and throttle controls, a brake operating member, stationary means providing trackways on each side of said member, said trackways having dwells therein and upwardly extending portions leading from said dwells, a pedal having rollers thereon engaging said trackways, means normally maintaining said pedal in a retracted position with said rollers in said dwells, means engageable by said pedal when in retracted position for operating the vehicle throttle control upon a rocking movement being imparted to said pedal, said pedal being longitudinally shiftable by foot pressure to move the rollers up said upwardly extending portions of said trackways into position for actuation of said brake operating member by said pedal upon the application of foot pressure to said pedal.

4. In a motor vehicle having brake and throttle controls, a brake operating member, means providing trackways on each side of said member, said trackways having dwells therein and upwardly extending portions leading from said dwells, a foot pedal having rollers thereon engaging said trackways, means normally maintaining said rolls in said dwells to maintain said pedal in a retracted position, means engageable by said pedal when in retracted position for operating the vehicle throttle when rocking movement is imparted to said pedal, said pedal being longitudinally movable by foot presure to move said rollers up the upwardly extending portions of the trackways, said brake operating member being engageable by said pedal when in said longitudinally removed position to be moved thereby to actuate the brake controls.

5. In a motor vehicle having accelerator and brake controls, a vertically rockable pedal, a pivotally mounted member operable by rocking movement of said pedal to actuate the brake controls, a stationary mounting for said pedal adapted to allow rocking and longitudinal movement of said pedal, means associated with said pedal and said member to normally retain the pedal in a retracted position, means operable by said pedal when rocked in said retracted position by toe pressure for actuating the accelerator control, said pedal being movable by foot pressure in a longitudinal direction to free said pedal from operation of said accelerator actuating means and to place said pedal in position to move said pivotally mounted member to actuate the brake control when pressure is applied to said pedal.

6. In a device of the class described, a pivotally mounted brake actuating member and a floatingly mounted accelerator actuating member, means providing tracks, a shaft mounting said accelerator actuating member, grooved rollers on said shaft engaging said tracks for guidance, dwells in said tracks, means normally maintaining said rollers in said dwells and said accelerator actuating member in retracted position, said tracks having upwardly and forwardly extending portions along which said rollers move when foot pressure is applied to said accelerator actuating member to move said member along said first mentioned member, said members having cooperatively engaging parts to move said brake actuating member when said accelerator actuating member is shifted and is moved by foot pressure applied to it.

7. In combination with a brake shaft and a brake pedal, an auxiliary shaft parallel to said brake shaft, a member keyed to said auxiliary shaft, a depresser arm keyed to said auxiliary shaft and adapted to engage the brake pedal for moving the brake shaft in one direction, and a foot pedal overlying said member and adapted when depressed to move said member to apply the brakes.

8. A two-part pedal structure for selectively actuating the accelerating and brake mechanism of an automotive vehicle, comprising a shaft parallel to the brake shaft and carrying an arm adapted to contact the brake pedal to actuate the same to apply the brakes, one of said parts being keyed to said shaft, the other of said parts comprising a pedal supported for rocking movement with respect to said one part and also for movement in the direction of the length of said one part, means for normally maintaining said other part in retracted position with respect to said one part, means operable by said other part when rocked in said retracted position to actuate the accelerator mechanism, and means affording engagement between said two parts to depress said one part when said other part is advanced along said one part and said other part is depressed to actuate said brake mechanism.

9. In a combination brake and accelerator control structure, a shaft, a member pivotally mounted on said shaft for actuation of a brake control, a stationary track having a dwell and a surface extending therebeyond in an arc having the axis of said shaft as its center, a foot pedal having rollers mounted on said track for rocking movement when said rollers are in said dwell to actuate an accelerator control and for movement onto said arc shaped surface during cooperation with said pivotally mounted member for actuation of said brake control.

10. In a combination brake and accelerator control structure, a shaft, a member pivotally mounted on said shaft for actuation of a brake control, a stationary track having a dwell and a surface extending therebeyond in an arc having the axis of said shaft as its center, a foot pedal having rollers mounted on said track for rocking movement when said rollers are in said dwell to actuate an accelerator control and for movement onto said arc shaped surface during cooperation with said pivotally mounted member for actuation of said brake control, said pedal and member having interengaging portions to lock the same for movement as a unit about said shaft during actuation of said brake control.

11. In a combination brake and accelerator control structure, a shaft, a member pivotally mounted on said shaft for actuation of a brake control, a stationary track having a dwell and a surface extending therebeyond in an arc having the axis of said shaft as its center, a foot pedal, an axle carried by said pedal, rollers on the ends of said axle adapted to travel along said track to permit rocking movement of said pedal when said rollers are in said dwell to actuate an accelerator control and for movement onto said arc shaped surface during cooperation with said pivotally mounted member for actuation of said brake control, said pedal and member having interengaging portions to lock the same for movement as a unit about said shaft during actuation of said brake control.

12. In a combination brake and accelerator control structure, a shaft, a member pivotally mounted on said shaft for actuation of a brake control, a stationary track having a dwell and a surface therebeyond curved in an arc about the axis of said shaft as a center, a pedal, an axle carried by said pedal having rollers thereon for movement on said track, said member having means including an arm overlying said axle serving to guide and hold said pedal and member in operative relationship as said pedal is moved on said rollers onto and along said curved track surface to actuate said brake control.

13. In a combination brake and accelerator control structure, a shaft, a member pivotally mounted on said shaft for actuation of a brake control, a stationary track having a dwell and a surface therebeyond curved in an arc about the axis of said shaft as a center, a pedal, an axle carried by said pedal having rollers thereon for movement on said track, said member having means including an arm overlying said axle serving to guide and hold said pedal and member in operative relationship as said pedal is moved on said rollers onto and along said curved track surface to actuate said brake control, said means being so arranged as to permit individual rocking movement of said pedal when said rollers are in said dwell to actuate the accelerator control.

14. In a combination brake and accelerator control structure, a shaft, a member pivotally mounted on said shaft for actuation of a brake control, a stationary track having a dwell and a surface therebeyond curved in an arc about the axis of said shaft as a center, a pedal, an axle carried by said pedal having rollers thereon for movement on said track, said member having means including an arm overlying said axle serving to guide and hold said pedal and member in operative relationship as said pedal is moved on said rollers onto and along said curved track surface to actuate said brake control, said means being so arranged as to permit individual rocking movement of said pedal when said rollers are in said dwell to actuate the accelerator control, and spring means extending between said member and pedal to prevent relative movement of the same out of operative association provided by said means.

NELSON I. PERRY.